March 1, 1932. E. F. BURCH 1,848,054

DEWAXING PETROLEUM OIL

Filed July 24, 1929

INVENTOR
ELI F. BURCH
BY Edmund G. Borden
ATTORNEY

Patented Mar. 1, 1932

1,848,054

UNITED STATES PATENT OFFICE

ELI F. BURCH, OF LAUREL SPRINGS, NEW JERSEY, ASSIGNOR TO DOHERTY RESEARCH COMPANY, OF NEW YORK, N. Y., A CORPORATION OF DELAWARE

DEWAXING PETROLEUM OIL

Application filed July 24, 1929. Serial No. 380,768.

This invention relates to improvements in the manufacture of lubricating oils and particularly to a process for refining and dewaxing lubricating oil stocks and the production of a lubricant having a relatively low pour test.

With the rapid increase in the quantity of lubricants manufactured for internal combustion engines, removal of wax from lubricating oil stocks has received increased attention. While filtration is one of the oldest and most important methods of dewaxing oils, the present filtration procedure is open to the criticism that the filtered oil produced has a relatively high pour test. This defect in the resulting lubricant is very apparent when attempt is made to use it in aircraft motors or other internal combustion engines during cold weather.

An important object of the present invention is therefore to provide an improved filtering process for dewaxing vacuum distilled wax distillates.

With this and other objects in view the invention comprises a process described in detail hereinafter in connection with certain specific examples.

The lubricating oil stock to be treated in accordance with the present invention is preferably subjected to a vacuum distillation in which the vapors produced are fractionated in such a manner that substantially all of the wax content of the oil is collected in a single distillate cut. This vacuum distillate containing the wax is next cooled and refrigerated in the usual way for the purpose of precipitating the wax in the oil. The chilled wax distillate containing the wax in suspension is next subjected to filtration for the removal of the wax, in which step use may be made of a filter aid if desired.

The filtering operation may be carried out in existing equipment by suitable modifications when necessary. In using the familiar type of plate and frame filter press (Liddell, "Handbook of Chemical Engineering," 1922, page 298) for removing the wax content of the chilled distillate, the mixture is passed under pressure through the various sections of the filter press in such a manner that oil is supplied so as to completely cover the filtering area during the whole period necessary for building up the desired layer of filter cake. As soon as a sufficient filter cake has been built up in the various sections, the supply of oil mixture under pressure is discontinued and air or other medium under pressure is used to drive the occluded oil from the filter cake as in the usual procedure, but this oil is not collected with the filtrate obtained up to the time the oil-wax mixture is cut off. The filter cake may now be washed with cold naphtha or other suitable washing medium but the filtrate obtained is kept separate from the main filtrate.

If the filtering operation is to be conducted with a continuous filter such as a rotating drum type of continuous vacuum filter (Liddell, "Handbook of Chemical Engineering", 1922, page 292, or Industrial and Engineering Chemistry (news edition) for October 10th, 1927, page 16), the oil-wax mixture is maintained in contact with the successive sections of the filter surface for a sufficient period of time to build up on the filter surface a wax cake having a desired thickness.

In the accompanying drawings, Fig. 1 is a diagrammatic view in side elevation of a continuous vacuum filter of the rotating drum type adapted for use in accordance with the present invention.

Figure 1:
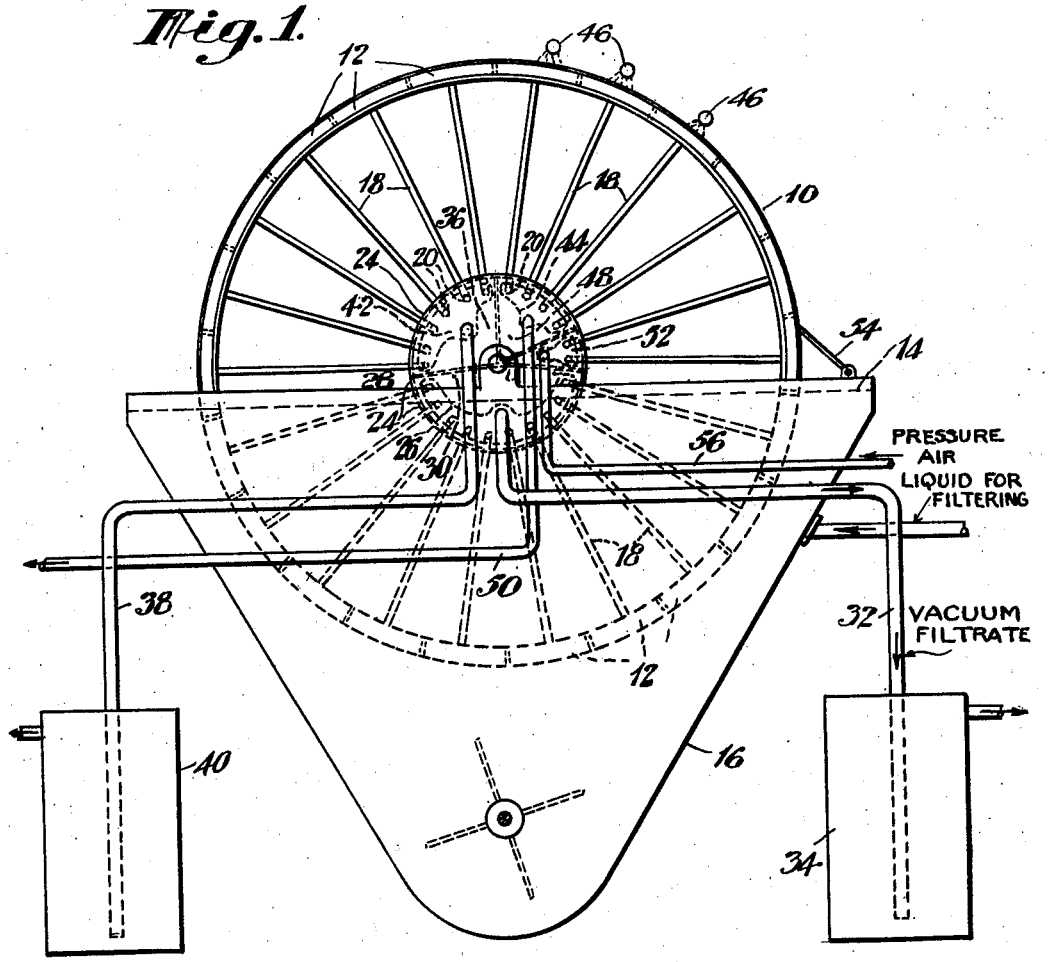
Figure 2:
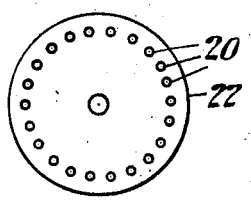
Fig. 2 shows in elevation the stationary valve plate element of the filter illustrated in Fig. 1.
Figure 3:
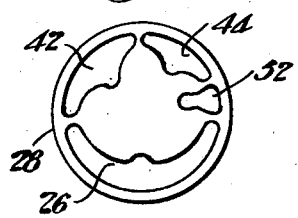
Fig. 3 shows in elevation the revolving plate element of the valve member of the filter of Fig. 1.

In operating the rotating drum type of continuous vacuum filter illustrated diagrammatically in the accompanying drawings, the filter drum 10 rotates continuously in a clockwise direction at a rate which maintains panels 12 of the peripheral filter surface of the drum submerged below the level 14 of liquid oil-wax mixture in tank 16 for a period of time sufficient to build up on the filter surface of each panel 12 a wax cake having the desired thickness. During this operation vacuum is applied to the filtering surface so as to draw oil filtrate through the submerged panel sections, thence through the radial pipe 18 connecting each panel to the corresponding port 20 in the revolving plate 22 (Fig. 2) of valve housing 24, and thence through a port 26 in the stationary valve plate 28 (Fig. 3) into partitioned valve compartment 30, from which the filtrate flows through pipe 32 to storage in tank 34. The valve housing 24 is divided into as many compartments as there are ports in plate 28. In accordance with the present invention, communication between valve compartment 30 and the submerged filtering panels of the drum is discontinued just prior to the removal of each filter panel from the body of oil, so that the filtrate collected in tank 34 will have passed through the filter only during the time the filter was completely immersed in the oil-wax mixture. As soon as the particular filtering area and wax cake is removed from the mixture the suction or vacuum may be continued for a time, but the filtrate or occluded oil contained in the filter cake is separately collected in compartment 36 of valve 24 and passed by pipe 38 to storage in tank 40, or returned to the original distillate being chilled. Thus in filtering the oil in accordance with the above procedure the vacuum may be continued on each filtering area as it emerges from the body of oil-wax mixture, but the oil filtrate collected from the filter cake after it emerges must be trapped separately from that collected in tank 34 during the time the filtering area is submerged.

The stationary valve plate 28 has its inner face carefully ground so as to make intimate contact with the revolving plate 22. Port 26 is dimensioned to receive filtrate from all the panels 12 which are submerged in the liquid in tank 16 and is under vacuum and discharges liquid into compartment 30. 42 is a valve port with which all the pipes 18 from the ascending panels communicate after emerging from the liquid, and from which filtrate is discharged into compartment 36. 44 is a valve port communicating with the panels in the earlier part of their descent, while the filter cake is washed by sprays 46, port 44 discharging into compartment 48 which is under suction applied through a pipe 50. 52 is a port communicating with each panel just before it reaches scraper 54, port 52 admitting air under pressure from pipe 56 to dislodge the cake and cleanse the filter surface.

In the course of many tests carried out on various wax containing stocks, it has been found that the filtered oil collected during the time the filter cake was completely covered with oil-wax mixture had a pour test averaging about 15° F. lower than that of the oil drawn from the filter cake after the supply of oil-wax mixture had been cut off or the particular filtering area had been removed from the body of oil-wax mixture.

The following comparisons will illustrate the effect of separately collecting the filtrate in the manner described above:

A paraffin distillate chilled to about 7° F. is filter-pressed under pressure until the press is full of wax. During this operation the filtrate shows a pour test of about 9° F. The supply of wax-oil mixture is discontinued and the pressure maintained for a considerable time to dry the wax cake. The filtrate oil removed from the wax cake in this step shows a pour test of about 21° F.

The filter cake collected on a continuous vacuum filter is usually much thinner than that produced with a filter press, while the difference in pour test between the main filtrate and strippings is usually somewhat greater.

In using certain types of filtering apparatus modifications in construction may be necessary in order to operate the same in accordance with the process of the present invention. For example, in using the continuous rotary vacuum filter it may be necessary to provide an entirely new valve plate in order to secure the separation of the filtrate at the proper time or interrupt the vacuum when the particular filtering area begins to emerge from the body of oil-wax mixture. In using the continuous rotary vacuum filter the degree of vacuum applied to the filter cake after its removal from the body of oil may be much less than that applied during the time the cake is submerged.

In describing the features of the invention reference has been made to the treatment of a specific wax distillate, but it is to be understood that the invention is not limited to the treatment of any particular wax-containing oil but may be used for dewaxing any wax-containing stock in which the wax may be precipitated by chilling or by the use of a precipitating agent such as a material which is a solvent for the oil and not for the wax.

The apparatus referred to in the above description is merely exemplary of various types of filters which may be used, and is not to be considered as limiting the invention.

Having thus described the preferred form of the invention what is claimed as new is:

1. The process of filtering chilled vacuum distilled wax distillate containing precipitated wax in suspension, which comprises maintaining a body of the mixture so as to completely cover a filtering medium through which the oil is drawn by a vacuum and passed to storage, continuing the filtering operation until a substantial layer of wax cake has been built up on the filtering medium, then interrupting the application of vacuum to said filtering medium, renewing the vacuum on said filtering medium and wax cake in the absence of said oil body thereby to strip the wax cake of its content of oil, and recovering the resulting oil separate from the oil previously drawn through the cake and filtering medium.

2. In the process of dewaxing chilled vacuum distilled wax distillate containing precipitated wax in suspension, in which the mixture is subjected to vacuum filtration and oil strippings are drawn from the resulting wax cake on the filter after the supply of oil to the filtering medium is discontinued, the improvement which comprises collecting the oil stripping separately from the oil drawn through the filter prior to discontinuing the supply of oil thereto, thereby to prevent contamination of the latter oil with oil of higher pour test.

3. The process of obtaining a lubricating oil stock having a relatively low pour test, which comprises chilling the stock to precipitate wax therein, subjecting the chilled stock containing precipitated wax in suspension to filtration to remove the wax from the oil, maintaining the filtering area and resulting wax cake collecting thereon completely covered with oil-wax mixture until a sufficient wax cake has been built up over the filtering area, then discontinuing the supply of oil-wax mixture to the filtering area, draining the oil out of the remaining wax cake, and separately collecting the filtrate oil passing through the filter and wax cake before the supply of oil-wax mixture is discontinued, from the oil strippings obtained thereafter.

4. The process of obtaining a relatively low pour test lubricating oil from a vacuum distillate of lubricating oil stock, which comprises diluting the distillate with naphtha, chilling the resulting mixture to precipitate wax therein, separating the wax from the mixture by filtration under conditions such that wax-oil mixture is maintained over the whole filtering area until a desired thickness of wax cake is collected thereon, thereafter draining the oil out of the wax cake in the absence of oil-wax mixture covering said area, and separately recovering the filtrate oils obtained in the two filtering operations.

5. In the dewaxing of lubricating oil stocks in which chilled oil containing wax in suspension is subjected to filtration for the removal of the wax, the improvement which comprises separately collecting the oil filtrate obtained while oil-wax mixture completely covers the filtering area and the strippings drained from the wax cake on the filtering area after the oil-wax mixture no longer covers the filtering area, thereby to produce a lubricant of relatively low pour test.

6. In a process for the dewaxing of lubricating oil stocks by the use of a continuous vacuum filter in which each section of the filter passes through a body of chilled oil containing wax in suspension, and in which oil is drawn through each section while it is submerged in said body and oil strippings are drawn from the filter and wax cake thereon after removal from said body, the steps in the said process which comprise drawing of the oil drawn through each section of the filter while it is submerged in said body, and separately drawing off and recovering the oil strippings drawn from said sections after removal from said body.

7. The process of dewaxing a vacuum distilled lubricating oil distillate in which the wax has been precipitated, which comprises filtering off the wax from the oil-wax mixture by forcing it through a filter under differential pressure, maintaining the surface area of the filter completely covered with said mixture until a desired thickness of wax cake is accumulated thereon, forcing the oil contained in the filter and wax cake therefrom under differential pressure and recovering the last mentioned oil separately from the oil obtained while the surface of the filter is completely covered with oil-wax mixture.

In testimony whereof I affix my signature.

ELI F. BURCH.